(12) United States Patent
Bellifernine

(10) Patent No.: US 7,048,437 B2
(45) Date of Patent: May 23, 2006

(54) INFRARED THERMOMETER AND WAVEGUIDE FOR INFRARED THERMOMETER

(75) Inventor: Francesco Bellifernine, Varese (IT)

(73) Assignee: Castellini S.p.A., Bologna (IT)

(*) Notice: Subject to any disclaimer, the term of this patent is extended or adjusted under 35 U.S.C. 154(b) by 0 days.

(21) Appl. No.: 11/215,924

(22) Filed: Aug. 31, 2005

(65) Prior Publication Data
US 2006/0007984 A1    Jan. 12, 2006

Related U.S. Application Data

(63) Continuation of application No. 10/276,454, filed as application No. PCT/IT00/00250 on Jun. 16, 2000.

(30) Foreign Application Priority Data
May 19, 2000 (IT) ............ MI2000A1115

(51) Int. Cl.
*G01J 5/00* (2006.01)
(52) U.S. Cl. ............ 374/121; 374/208; 374/132
(58) Field of Classification Search ........ 374/120–121, 374/130–132, 160, 183, 208
See application file for complete search history.

(56) References Cited

U.S. PATENT DOCUMENTS

| | | | |
|---|---|---|---|
| 3,535,016 A | 10/1970 | Malifaud | |
| 3,581,570 A | 6/1971 | Wortz | |
| 4,596,050 A | 6/1986 | Rogers | |
| 4,743,122 A | 5/1988 | Yamano et al. | |
| 4,854,730 A | 8/1989 | Fraden | |
| 4,868,791 A | 9/1989 | Cathignol et al. | |
| 5,339,380 A | 8/1994 | Wysocki et al. | |
| 5,388,907 A | 2/1995 | Aoyama et al. | |
| 5,820,264 A | 10/1998 | Tsao et al. | |
| 5,848,842 A | 12/1998 | Peuse et al. | |
| 5,860,741 A | 1/1999 | Tsao et al. | |
| 6,292,685 B1 | 9/2001 | Pompei | |
| 6,435,711 B1* | 8/2002 | Gerlitz | 374/130 |
| 6,543,933 B1 | 4/2003 | Stergiopoulos et al. | |
| 2002/0186746 A1 | 12/2002 | Tomioka et al. | |
| 2003/0016728 A1 | 1/2003 | Gerlitz | |
| 2004/0076217 A1 | 4/2004 | Lin | |
| 2005/0207470 A1* | 9/2005 | Bennett et al. | 374/130 |

FOREIGN PATENT DOCUMENTS

| | | |
|---|---|---|
| DE | 299 12 619 U | 1/2000 |
| JP | 356 074626 A | 6/1981 |
| JP | 359 194512 A | 11/1984 |

OTHER PUBLICATIONS

M. Alaluf et al., "Infrared Radiometry Measurements Using Plastic Hollow Waveguides Based on Thin Films", Journal of Physics D: Applied Physics, B, IOP Publishing, Bristol, vol. 26, No. 7, Jul. 14, 1993, pages 1036-1040.

(Continued)

*Primary Examiner*—Yaritza Guadalupe
(74) *Attorney, Agent, or Firm*—Pearne & Gordon LLP

(57) ABSTRACT

An infrared thermometer comprises a detecting portion provided with a waveguide (8) having a tubular conformation and capable of conveying the infrared radiation emitted from a detecting surface towards a sensor member (7) housed within the infrared-thermometer holding body; the waveguide has the conformation of a parabola the extension of which increasingly more converges in the direction of the sensor member (7).

27 Claims, 6 Drawing Sheets

OTHER PUBLICATIONS

V.W. Tychowsky et al., "Development and Application of a Gold Cup Sensor for Measurement of Strip Temperatures on a Continuous Galvanizing Lin", Iron and Steel Engineer, U.S., Association of Iron and Steel Engineers. Pittsburgh, vol. 75, No. 9, Sep. 1, 1998, pp. 37-42.

* cited by examiner

INFRARED THERMOMETER AND WAVEGUIDE FOR INFRARED THERMOMETER

This application is a continuation application of U.S. patent application Ser. No. 10/276,454 filed Apr. 21, 2003, which is a 371 of PCT/IT00/00250, filed Jun. 16, 2000.

DESCRIPTION

The present invention relates to an infrared thermometer and a waveguide to be used in an infrared thermometer.

It is known that beside the traditional thermometers, for instance mercury thermometers with reading of the body temperature by contact with the patient, infrared thermometers have presently had a widespread use, said thermometers being capable of detecting the temperature of a given subject based on an infrared emission generated by the latter.

In particular, infrared thermometers comprise a reading section, in which an infrared-radiation sensor operates and to which the infrared radiation emitted by the body region the thermal detection of which is to be carried out, is conveyed.

Infrared thermometers presently available on the market are substantially divided into two big families: partly invasive thermometers and non-invasive thermometers.

The first typology of infrared thermometers contemplates insertion of a thermometer portion or probe into the auricle of the subject whose temperature is to be measured so that the infrared radiation of this region can be conveyed towards a sensing member. By virtue of the thermal stability of the concerned detecting region, a thermal reading of good accuracy and repeatability can be obtained.

While being generally valid, the above described thermometers however show some limits connected with use of the thermometers under hygienic conditions, which involves the necessity to employ protection caps for the probe, and also connected with the reduced practical use of same because the thermometer probe in any case constitutes a bothersome foreign body to be partly introduced into the patient's auricle.

The second typology of infrared thermometers, i.e. the non invasive ones, contemplates the possibility of keeping the thermometer end designed to convey the infrared radiation towards the sensing member to a predetermined distance from the surface of the subject whose thermal level is wished to be known.

In this second thermometer typology, in order to have a good reading of the thermal level the thermometer needs to be positioned to a predetermined distance from the detecting surface, within well limited ranges.

It is in fact essential that the sensor designed to detect the infrared radiation should be reached by emissions from the patient submitted to reading, and in particular emissions from a predetermined area of the patient himself/herself. In fact, a detection leading to transmission to the sensor present in the thermometer of radiation emissions coming from bodies completely extraneous to the patient or from unspecified areas of said patient would have no meaning. It should be recognized, in fact, that the human body even of one and the same subject can have differentiated thermal levels depending on the reading region: typically there is a tendency to carry out reading at the forehead region which has a sufficiently even surface, substantially flat and devoid of elements capable of altering measuring.

After such short statements, it is to be pointed out that the same Applicant has devised different systems for pointing and positioning of the detecting portion of an infrared thermometer to the correct position relative to the subject on which thermal detection is to be carried out (see publication No. PCT/IT98/00379, for example).

Beside the above, it is apparent that for obtaining a reliable and repeatable reading it would be necessary that the infrared radiation should be picked up from a reading area which is the most definite and, typically, the smallest possible area. This would be, for example, possible by use of relatively long waveguides and by moving very close, in axial terms, to the emission surface of the subject submitted to thermal detection.

However, such a manner of acting would inevitably lead to an important lowering of the signal that can be sensed by the sensor member as well as to a reduced practical use of the thermometer: if one should be obliged to move too close to the detecting surface, a risk of contact would exist and this would impair the desirable feature of absolute non-invading character that the infrared thermometers of the described second typology must have.

In the light of the above, an unresolved technical problem is production of an infrared thermometer capable of operating to some distance from the surface of the subject concerned with thermal detection and also capable of picking up the radiation signal exclusively from a limited region of the subject, without reducing the signal reaching the infrared-radiation sensor too much and without having negative repercussions in terms or signal/noise ratio.

It is also desirable that the above problem should be resolved without resorting to complicated optical systems that would make it inappropriate to propose on the market the product thus obtained.

The above identified technical problem and still other problems are substantially resolved by a waveguide for infrared thermometers and by an infrared thermometer having the features recited in the appended claims 1 and 11, respectively.

Further features and advantages will be more apparent from the detailed description of a preferred but not exclusive embodiment of an infrared thermometer and a waveguide for infrared thermometers in accordance with the present invention. This description will be carried out hereinafter with reference to the accompanying drawings, given by way of non-limiting example, in which.

Figure 2:
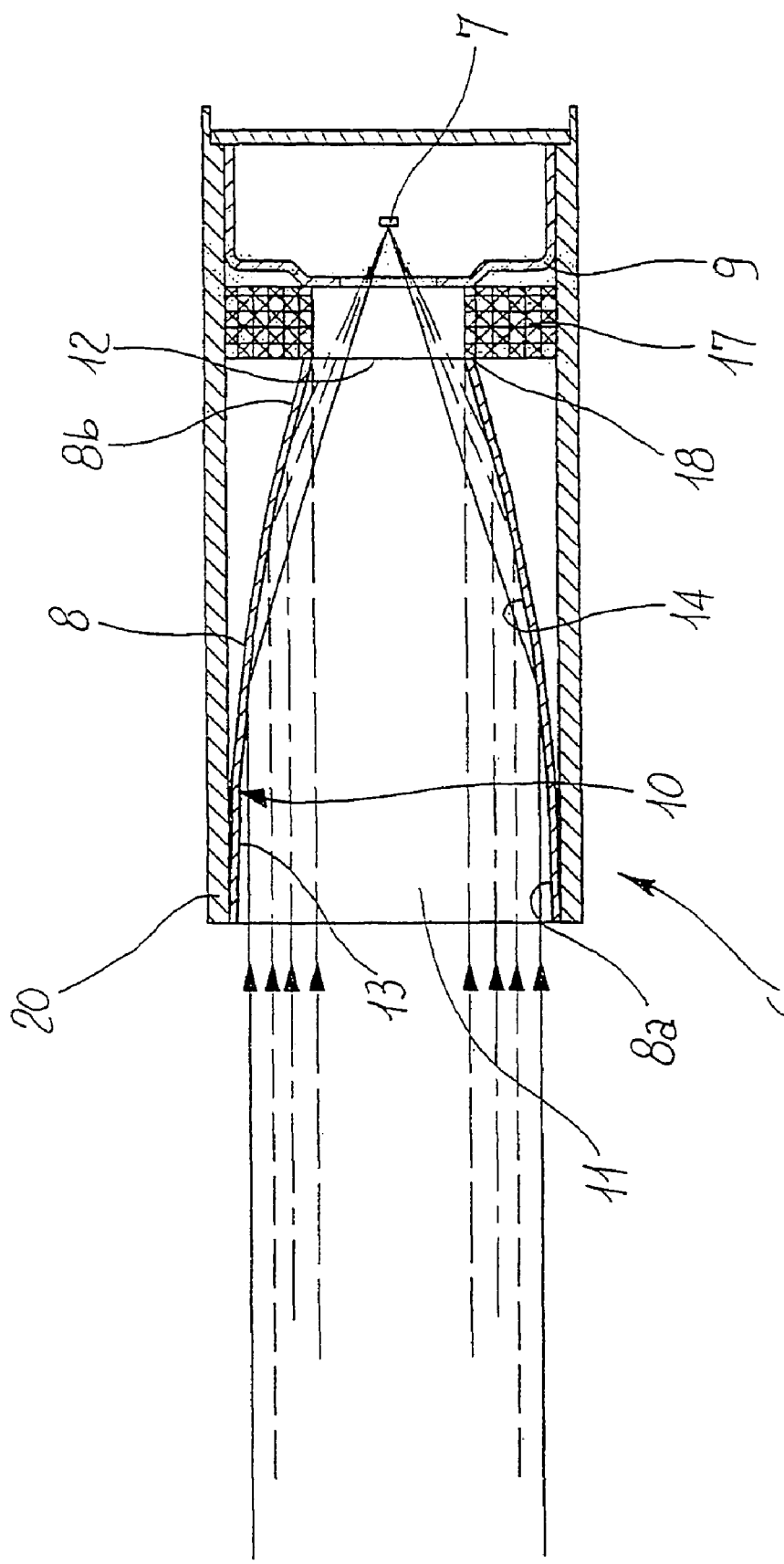
FIG. 2 is a diagrammatic longitudinal section of a waveguide provided in a detecting portion of an infrared thermometer, in accordance with the present invention, in which also shown are radiation emissions coming from the emission surface and directed parallel to the longitudinal axis of the waveguide.
Figure 3:
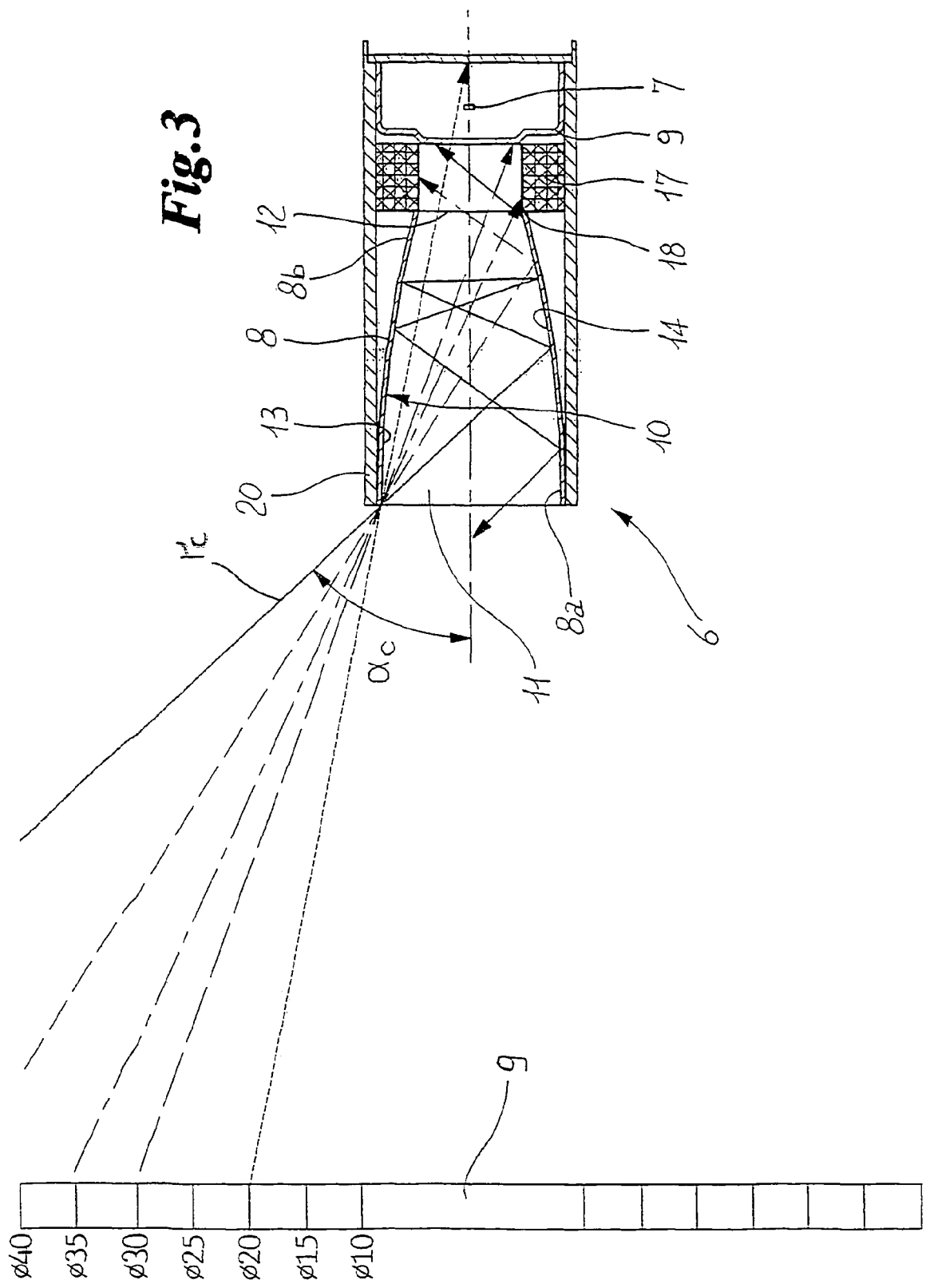
Figure 4:
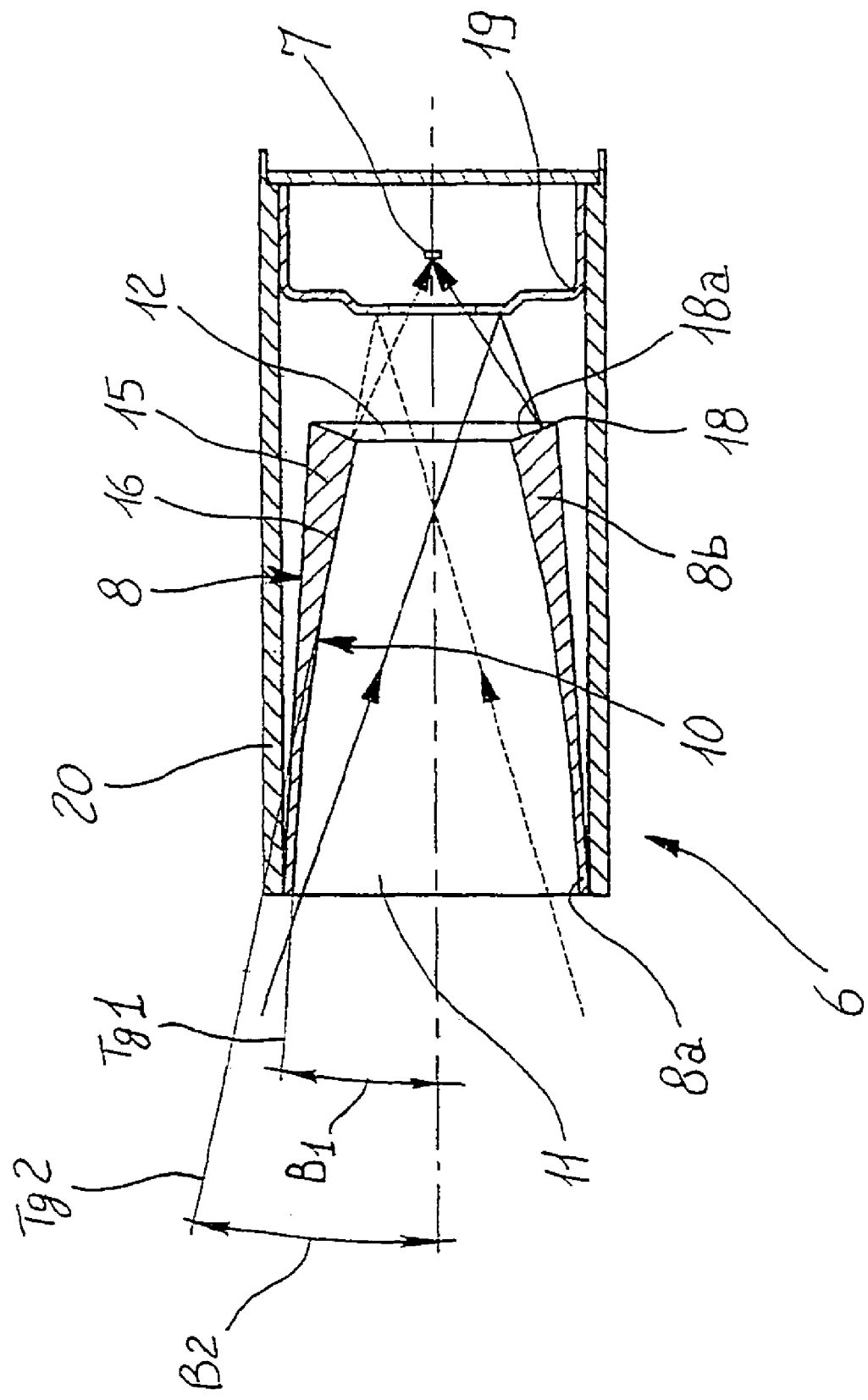
Figure 5:
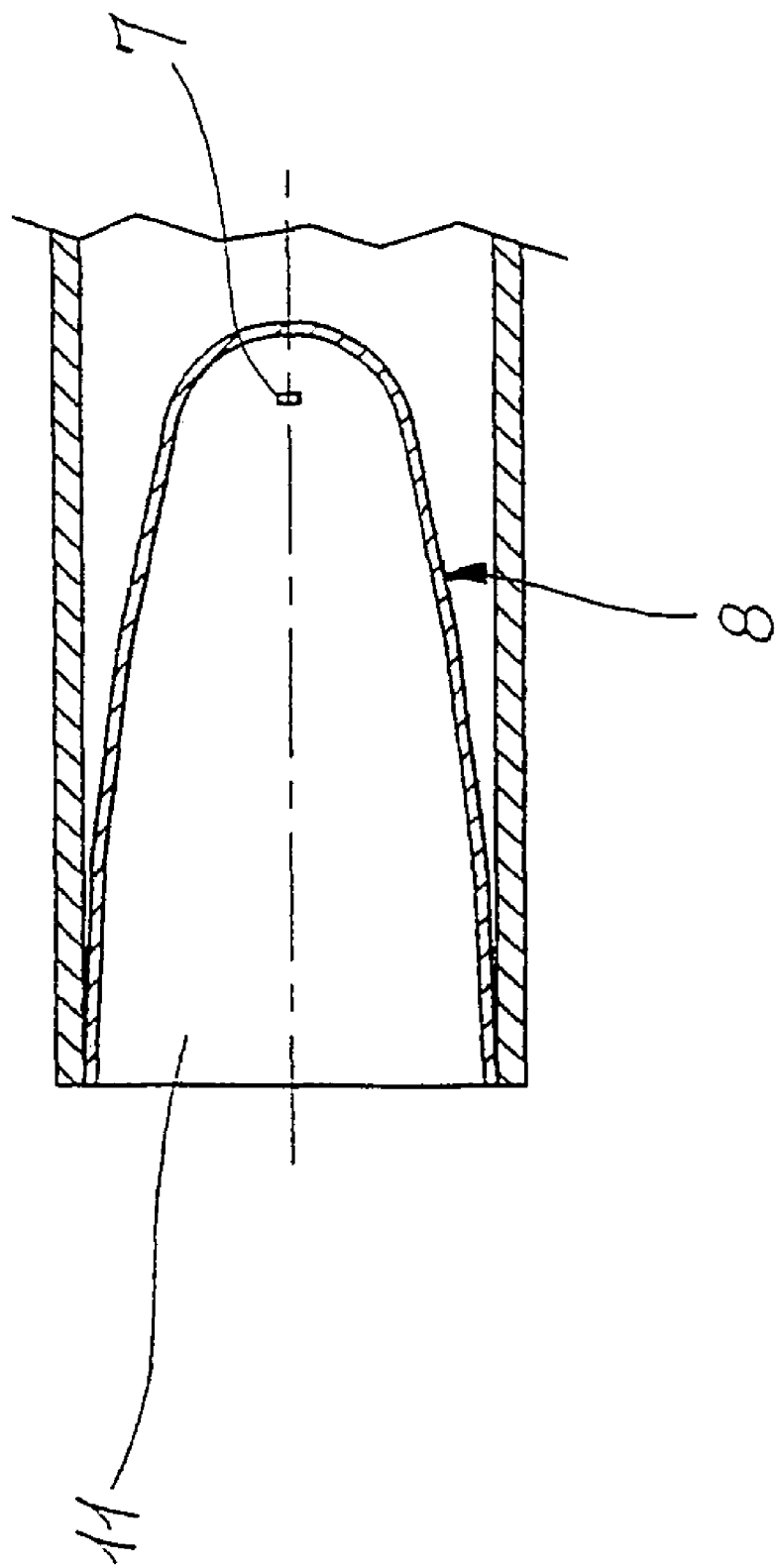
Figure 6:
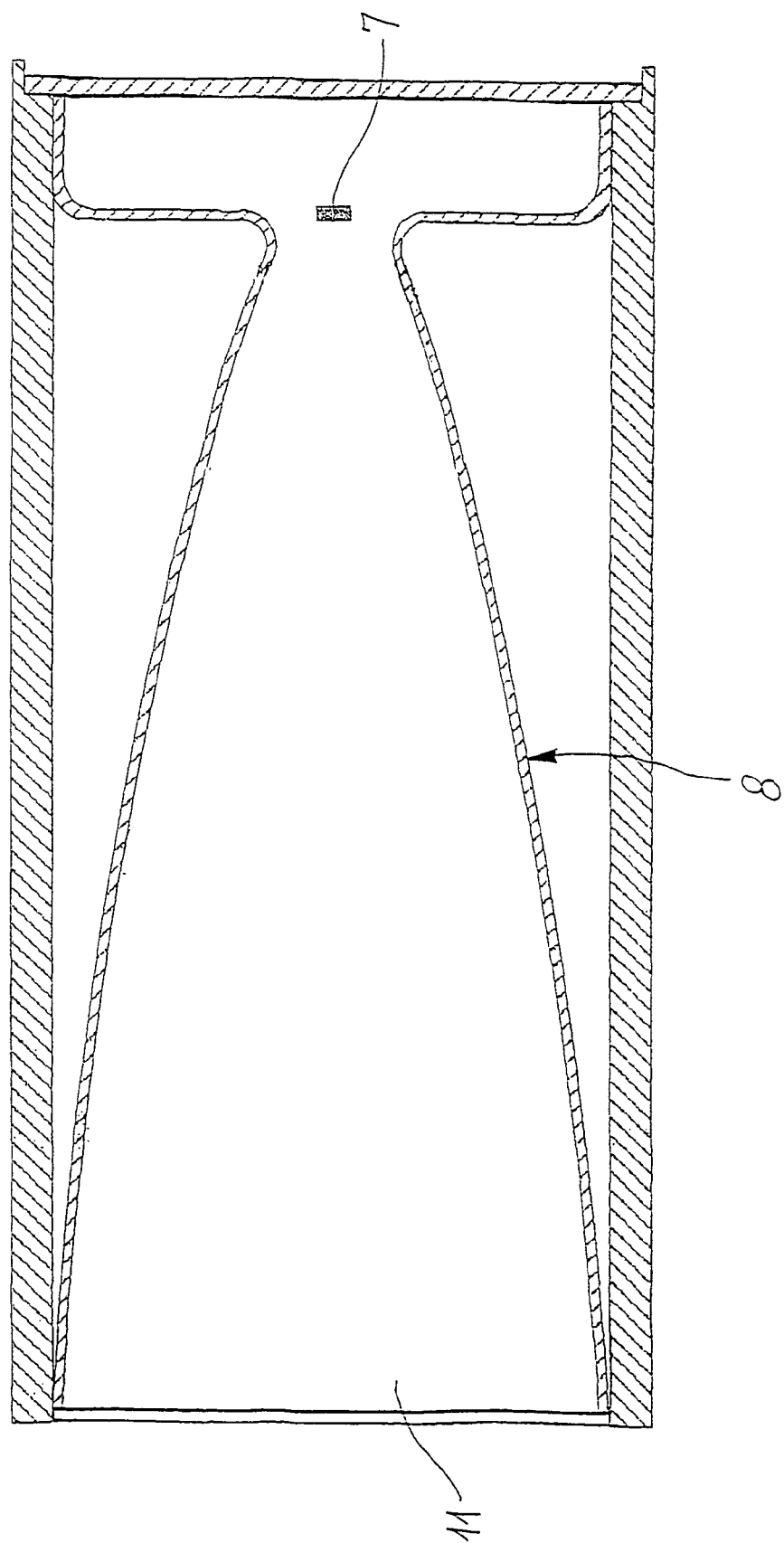
Figure 2:
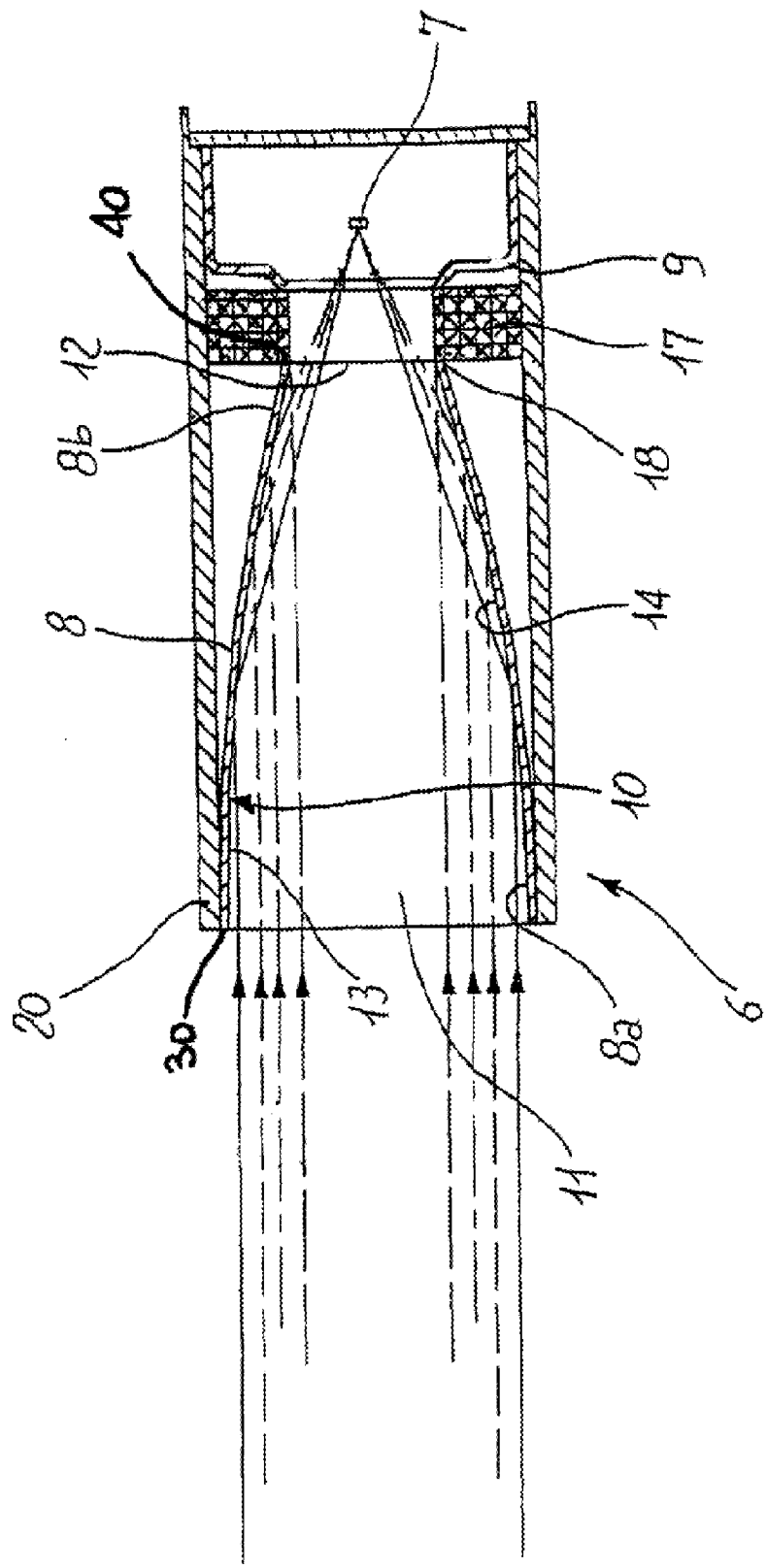
Figure 3:
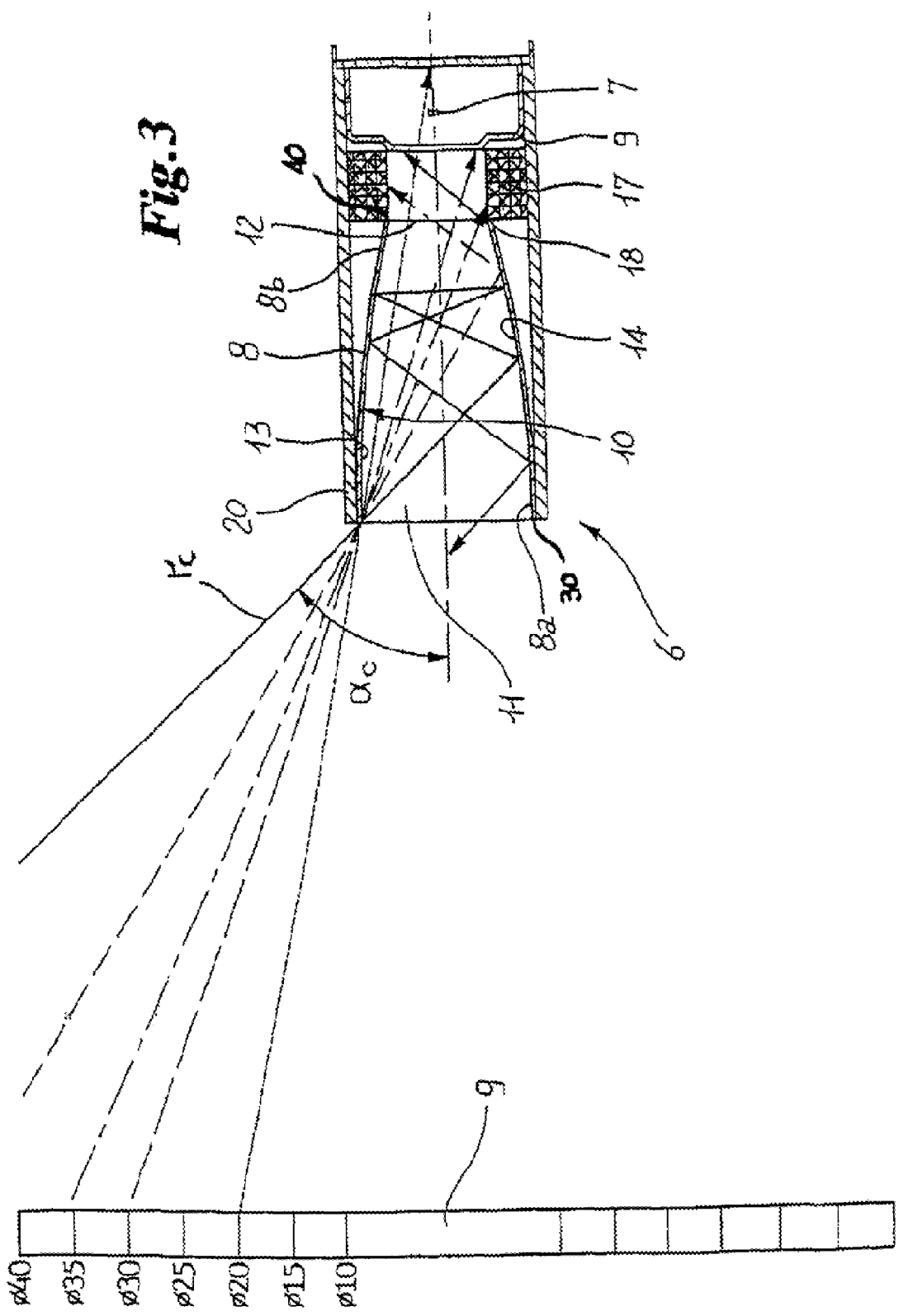

FIG. 3 diagrammatically shows the operating behaviour of the detecting portion referred to in FIG. 2 towards radiation emissions coming from the emission surface in directions inclined to a longitudinal axis of the waveguide;

FIG. 4 is a diagrammatic longitudinal section of an alternative embodiment of a waveguide and a detecting portion of a thermometer in accordance with the invention; and FIGS. 5 and 6 show further alternative embodiments of a waveguide in accordance with the invention, still in longitudinal section.

With reference to the drawings, an infrared thermometer in accordance with the invention has been generally identified by reference numeral 1.

Conventionally, the infrared thermometer comprises a main holding body 2 defining a grip region 3 for a user. The handgrip may carry conventional operation means 4 such as keypads and the like, as well as one or more displays 5 for possible reading of the temperature or other information.

Provided at an end of the main body is infrared-radiation detecting means 6 comprising a sensor member 7 detecting the infrared-radiation intensity and at least one waveguide 8 operatively associated with the sensor member to suitably convey towards the latter the radiation emitted from the body region 9 the thermal level of which is wished to be measured.

In more detail, the waveguide 8 has a first end 8a turned towards the body the temperature of which is wished to be known, and a second end 8b turned towards the sensor member 7.

As can be seen from the accompanying drawings, the waveguide is structured in the form of a tubular body having a mirror-like inner surface 10 and defining a passage capable of bringing into optical communication a first and a second openings 11 and 12 of the tubular body opposite to each other.

The inner surface 10 of the waveguide has an extension converging towards the second opening 12, i.e. it has an inner diameter increasingly decreasing from the first opening 11 of the waveguide 8 to the second opening thereof where the sensor member 7 is substantially located.

More specifically, in accordance with the present invention, it will be recognized that convergence of the waveguide 8 is always more marked on moving close to the second opening 12 of the tubular body.

In other words, the waveguide of the invention can have two or more lengths, axially following each other, having a respective convergence which is constant in each length and progressively more marked on passing from one length to the following one in a direction towards the second opening 12 of the tubular body defining the waveguide.

Practically, in the just described case, at least the convergent portion of the waveguide will have a succession of frustoconical surfaces the taper of which is increasingly more marked on moving closer to the second opening 12.

Alternatively, two and preferably a greater number of said consecutive lengths of increasingly growing convergence may be replaced by a waveguide in which the inner surface is curved and it continuously and progressively converges in a more and more marked manner, on moving from the first opening towards the second opening.

At all events, the waveguide in accordance with the invention is embodied in such a manner that, the axial moving forward towards the second opening being the same, an increasingly greater diametrical reduction is obtained on moving from the first to the second opening.

In the waveguides illustrated by way of example in the accompanying drawings where longitudinal sections of same are shown, it is possible to notice that the inner surface 10 of the waveguide is defined by curved lines 13, 14 and, preferably, arcs of a conic section the axis of which is coincident with the longitudinal symmetry axis of the waveguide and the concavity of which is turned towards the first opening 11.

As can be seen, convergence of these arcs of a parabola is increasingly greater on moving closer to the second opening: the above statement is geometrically represented by drawing two tangents tg1, tg2 to line 13 that in longitudinal section represents the inner surface of the waveguide; it can be noticed that the acute angle defined by said tangents with the direction of the longitudinal symmetry axis of the parabola is increasingly wider on moving closer to the second opening along said curved lines ($\beta 2 > \beta 1$).

From a constructional point of view, the waveguide provided in the detecting portion of the subject thermometer comprises (see FIG. 4) an outer main body 15 of tubular conformation and an inner coating or lining 16 defining the inner surface 10 and having mirror-like features in order to be able to reflect the radiation striking thereon.

Preferably, the outer body 15 is made of a plastic mate-ial, whereas lining 16 is made of a thin film of metal material, preferably consisting of a gold alloy which appears to be particularly efficient due to its surface-finish and therefore mirror-like features, while at the same time it is not too delicate and therefore cannot be damaged if submitted to cleaning operations.

It should be recognized, in fact, that advantageously the subject waveguide at the first opening can preferably be devoid of any protection mask such as those typically provided in traditional waveguides for these uses and must therefore be submitted to periodical cleaning by users in order to ensure the required performance.

As can be understood, the possible absence of a protection mask is very advantageous because it avoids a useless loss of signal in the radiation entering the waveguide.

The detecting portion of the thermometer in accordance with the invention may also preferably comprise a radiation-absorbing element 17 of annular conformation and axially interposed between the waveguide 8 and sensor member 7.

More specifically, this annular absorbing element is positioned between an end edge 18 of the waveguide delimiting the second opening 12 and a holding casing 19 designed to house the infrared-radiation sensor.

The absorbing element 17 is preferably made of a deformable material such as plastics or rubber for example, or other material capable of being deformed at least axially so as to compensate for possible plays due to working tolerances. The radiation-absorbing element has a porous structure and is preferably of black colour so that it may absorb all radiation emissions striking thereon, substantially without reflections.

Practically, the infrared radiation that should come close to the second opening 12 and therefore the sensor member with a marked inclination relative to the longitudinal axis of the waveguide is substantially absorbed by the absorbing member without affecting the thermometer reading.

In accordance with a further alternative embodiment, as shown in FIG. 5, the waveguide may itself define the holding casing for the sensor member and be therefore provided with a single radiation inlet opening 11, turned towards the body the thermal level of which is wished to be known.

In this case too the wave guide may consist of a plurality of consecutive frustoconical lengths or a three-dimensional curved surface, a paraboloid for example; in this case the sensor member (FIG. 5) is disposed within the waveguide at the longitudinal axis and close to the closed end of the waveguide.

In the case of a paraboloid-shaped waveguide the sensor can be placed substantially close to the parabolic-surface focus, in order to particularly and efficiently collect the radiation from directions that are parallel to or have a limited inclination relative to the longitudinal axis of the waveguide itself.

A further alternative embodiment of the detecting portion and therefore the waveguide in accordance with the invention is shown in FIG. 4.

In this case the detecting portion is devoid of the absorbing element and the waveguide has a tubular body with an end edge 18 delimiting the second opening 12 and turned towards the sensor member, which end edge extends transversely of the longitudinal axis of the tubular body and has a glossy active surface 18a capable of reflecting at least part of the radiation striking thereon substantially towards the sensor member.

The surface of the end edge can be of truncated conical form (being therefore represented by a rectilinear segment in longitudinal section as shown in FIG. 4) or have a slight taper turned towards the sensor member (this case being not shown in the accompanying drawings).

In accordance with a further alternative embodiment (not shown) the waveguide may comprise a starting portion, i.e. a portion extending in the extension of the convergent portion on the opposite side with respect to the second opening, such shaped that the inner surface of this portion has a preferably cylindrical constant cross-section.

To be noted is the fact that beyond the structure given to the waveguide, said waveguide, as well as the sensor member operatively associated therewith, are typically housed within an auxiliary tubular body 20 of metal material, preferably copper or a Zn+Al+Mg alloy, seen in particular in the accompanying FIGS. 2, 3 and 4.

The subject infrared thermometer, in addition to the above described components, comprises a processing unit (not shown) capable of processing the output signal of the infrared-radiation sensor member and, through appropriate algorithms, generating the thermal reading that is transferred to the display or shown to the user through other displaying systems, projection systems for example as those described in application PCT/TT98/00379 in the name of the same Applicant.

The subject infrared thermometer may also be provided with control means operatively associated with the holding body and cooperating with the processing unit; this control means is designed to determine a condition of correct positioning of the sensor member 7 to a predetermined distance "D" from the detecting area, by selecting the correct-positioning distance which is considered as optimal for execution of a precise reading and for confining the reading area exclusively to the region of interest.

It is apparent that in addition to the above described particular shaping of the waveguide of the invention, a correct positioning to a suitable distance D between the sensor member and the detecting surface helps in obtaining a very precise thermal reading.

Figure 1:
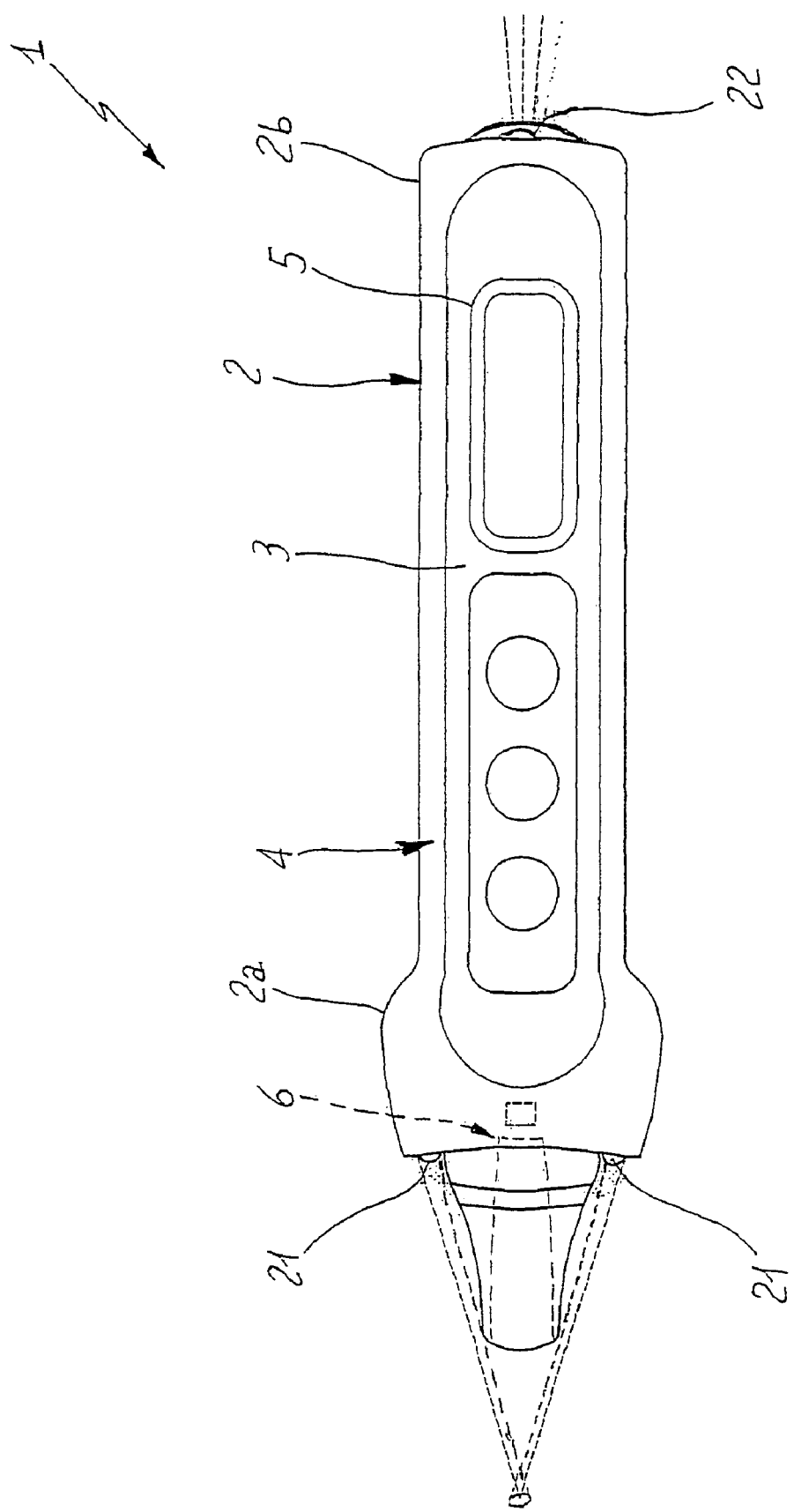
FIG. 1 is a diagrammatic general view of an infrared thermometer being the object of the present invention.

As regards accomplishment of the control means, different technical embodiments may be contemplated, to be used alone or in combination with each other. In particular, use of light emitters or pointing lights 21 (see FIG. 1) may be provided. In more detail, two or three visible light rays which preferably are convergent and not coplanar with each other may be foreseen. Specifically, these non-coplanar light rays are provided to converge towards a point P in such a manner as to determine a figure (a spot for example or others) when the sensor member is positioned to the correct distance "D" from the detecting area.

Alternatively, the employed control means may consist of an emitter of a light beam intended for striking on the detecting surface and being reflected by the latter to generate a return signal adapted to be sensed by a detecting member which is capable of calculating the inclination between the incident ray and the reflected ray. In particular, one or two detecting members may be provided for detection of said incident ray-reflected ray angle, which are positioned at symmetrically opposite positions and cooperate with the processing unit to draw the inclination of the reflected ray and therefore be able to go back, starting from said inclination, to the real distance of the sensor member from the detecting surface.

When this distance corresponds to the correct-positioning distance "D", audio/visible signals could be provided for signalling achievement of this condition to the user.

Still as an alternative to the two above mentioned embodiments or simultaneously therewith, the control means may comprise a generator of primary light beam which operates in such a manner as to focus a primary figure when the sensor member 7 is to the correct positioning distance "D".

Use of an optical matrix selector, of the liquid crystal type for example, may be provided, which is capable of varying the shape of the primary figure to be focused on the detecting surface. In more detail, the optical matrix selector is managed by the central processing unit (CPU) which is preferably able to vary the primary-figure shape depending on the detected temperature.

It is to be noted that combined with the primary light beam there may be a secondary light beam which is variable too with the use of an optical matrix selector, preferably of the liquid crystal type, adapted to be managed by the CPU. The second light beam too may be such controlled as to compose a secondary figure when the sensor member is to the correct distance "D" from the detecting surface.

The secondary figure too may be directly focused on the detecting surface and may combine with the primary figure and/or delimit the reading area from which the sensor member is reasonably presumed to detect the radiation and therefore draw the thermal information.

As a further alternative, which possibly can be also combined with the three above-described embodiments, the control means may finally comprise an emitter of an (audio and/or electromagnetic) incident undulatory signal which causes a return signal, following reflection on the detecting surface. The central processing unit coordinates emission and reception of the undulatory signal and calculates a time difference between the two signals. Obviously the time difference will be proportional to the distance of the thermometer, and therefore the emitter, from the surface of the body the thermal level of which is wished to be known. In this way it is possible to known when the sensor member is to the correct distance "D" from the detecting surface, which situation is signalled to the user by the CPU through signalling means of the visible or audio type for example.

In accordance with a further aspect of the invention the subject thermometer may comprise a light source 22 placed to a predetermined distance from the sensor means and operatively associated with the main holding body 2 as well. This light source can be switched on by an appropriate key for example, which is placed on the holding body for inspection of the patients buccal cavity and therefore detection of the presence of possible pathologies.

Advantageously, this light source is a cold light source and emits a light beam in a direction that does not affect the sensor member. In other words, the light source emits a beam directed according to a solid angle that does not illuminate the sensor member. Preferably the holding body of the infra-red thermometer in reference has an elongated structure and provides that the detecting portion and therefore the means for conveying the infrared radiation to the sensor member should be placed at a first end 2a of said holding body, whereas said light source is disposed at a second end 2b opposite to the first end of the holding body itself and sufficiently spaced apart therefrom.

In this way a possible even partial insertion of the second end 2b in a buccal cavity for example, does not involve any important influence on the sensor member and the thermal mass capable of altering possible subsequent measurements.

Obviously, two or more of said light sources may be provided, if required. At all events, it is preferable for these light sources to consist of LEDs (Light-Emitting Diodes) emitting white light or a light in a wavelength range included between 330 and 380 nanometres or between 480 and 580 nanometres. These wavelength ranges in fact, have proved to be very advantageous because the corresponding light radiation is adapted to enable a better identification of the typical pathologies for which the buccal cavity, larynx, pharynx, etc. can for example suffer.

Operation of the waveguide and the infrared thermometer according to the invention described above mainly as regards structure, is as follows.

Due to the shape of the inner surface of the waveguide which is progressively and increasingly more convergent close to the sensor member, the following effects are substantially reached.

Radiations directed parallel to the longitudinal axis of the waveguide or slightly inclined relative to said axis are conveyed by the waveguide and substantially focused on the sensor member, independently of the region at which they come in contact with the inner surface of the waveguide.

Vice versa the rays which have a too marked inclination as they come from a region of the patient's surface not of interest, and which can alter the thermal detection, can be either sent back towards the inlet opening of the waveguide following multiple reflections (practically at each reflection there is an increase in the ray inclination until 90° are exceeded with respect to the waveguide axis, as shown by the critical ray $r_c$ in FIG. 3) or absorbed by the absorbing element.

In general, by virtue of the conformation of the inner surface of the waveguide, rays having a greater inclination than the longitudinal axis of the waveguide do not succeed in getting to the second waveguide opening which can be reached either by the low-inclination rays (that will strike on the sensor member) or by rays that, depending on the inclination, can be absorbed by the absorbing element (if present), or be reflected by the end edge (if any) of the waveguide or will break against the inner or outer walls of the holding body of the sensor member.

It is however apparent that, due to the conformation given to the waveguide and the detecting portion in the different embodiments thereof herein described, an important reduction and above all a precise definition of the real radiation-detecting area on the surface of the body to be measured are achieved; in fact, the waveguide exercises a sort of optical filter for the coming radiation emissions that follow excessively inclined directions with respect to the longitudinal axis of the waveguide.

In addition to exerting a screening of the excessively inclined rays, the subject waveguide however succeeds in substantially focusing most of the rays from the reading area of real interest in an improved manner, on the whole obtaining a signal sufficient to enable thermal reading without radiations coming from regions that are not of interest and without an excessive reduction in the signal/noise ratio.

As it appears from the above, the advantages achieved by the waveguide and the thermometer in accordance with the invention are well apparent: definition of the reading region and reduction of same to the area of true interest so as to achieve very reliable thermal answers, simple construction of the proposed embodiments, possibility of always obtaining a good signal/noise ratio and therefore possibility of conveniently amplifying the output signals of the sensor member, all that without requiring manufacture of too long waveguides or the necessity to carry out the detecting operations to a very reduced distance from the surface or the body of the subject submitted to thermal detection.

What is claimed is:

1. Process for detecting infrared radiations emitted by a region of a human body and establishing the thermal level of such region, such process being carried out by using an infrared thermometer comprising:
   a main holding body;
   detecting means for detecting infrared radiations operatively associated with the main holding body, said detecting means having at least one sensor member of infrared-radiation intensity and at least one waveguide having a first end ready to be turned towards the region of the human body the temperature of which is wished to be known, and a second end turned towards said sensor member, said waveguide having an inner surface defining a passage for bringing into communication first and second openings opposite to each other, the openings being limited by respective borders and said inner surface having at least one portion converging in the direction of the second opening, said convergent portion of the waveguide comprising at least two lengths that are axially consecutive to each other, in which the length which is the closest to the second opening has a greater convergence than the other length;
   said process comprising the steps of:
   arranging said infrared thermometer so that the first end of said waveguide be turned towards the region of the human body and the radiations pass through the first opening of the inner surface;
   avoiding that radiations marked inclined with respect to a longitudinal axis of the waveguide reach the sensor member;
   conveying the radiations parallel or slightly inclined relative to the longitudinal axis of the waveguide towards the sensor member of the detecting means,
   reading the thermal level of the radiations conveyed to the sensor member;
   establishing the thermal level of the region.

2. Process as in claim 1, wherein the step of avoiding comprises the step of sending back the radiations marked inclined with respect to the longitudinal axis of the waveguide.

3. Process as in claim 2, wherein the step of sending back is executed by a multiple reflection of the marked radiations until the inclination of the latter be 90° exceeded with respect the longitudinal axis of the waveguide.

4. Process as in claim 1, wherein the marked radiations to be sent back by the waveguide are inclined with respect to the longitudinal axis of the waveguide according to an angle of incidence $\alpha_c$ whose magnitude is higher than 45°.

5. Process as in claim 1, wherein the radiations having a greater inclination than the longitudinal axis of the waveguide are directed far from the second opening of the inner surface of the waveguide.

6. Process as in claim 1, wherein the step of avoiding further comprises the step of absorbing the radiations marked inclined with respect to the longitudinal axis of the waveguide.

7. Process as in claim 6, wherein the step of absorbing is executed by conveying the marked radiations towards an absorbing element of the waveguide.

8. Process as in claim 1, wherein the step of avoiding comprises the step of breaking the radiations too marked inclined with respect the longitudinal axis of the waveguide.

9. Process as in claim 8, wherein the radiations are broken against inner walls of the holding body.

10. Process as in claim 9, wherein the radiations are broken against outer walls of the holding body.

11. Process as in claim 1, wherein the radiations slightly inclined with respect to the longitudinal axis of the waveguide are inclined according to an angle of incidence $\alpha_c$ whose magnitude is at least 45° inferior.

12. Process as in claim 1, wherein the radiations passing through the first opening of the inner surface of the waveguide reach the sensor member in the absence of any substantial loss of signal.

13. Process according to claim 1, wherein said step of arranging the first end of the waveguide comprises the step of placing the longitudinal axis of the waveguide substantially orthogonal to the region of the human body the temperature of which is wished to be known.

14. Process according to claim 1, wherein said step of arranging the first end of the waveguide comprises the step of not providing the first opening with a protection mask.

15. Process according to claim 1, further comprising a step of determining a correct positioning of the sensor member to a predetermined distance D from the region of the human body.

16. Process according to claim 15, wherein distance D is selected among correct positioning distances to be optimal for execution of a precise reading.

17. Process according to claim 15, wherein a selection distance D confines the reading area exclusively to the region of interest.

18. Process according to claim 1, wherein the waveguide is an optical filter for filtering incoming radiations that follow marked inclined directions with respect to the longitudinal axis of the waveguide.

19. Process for detecting infrared radiations emitted by a region of a human body and establishing the thermal level of such region, such process being carried out by using a portable infrared thermometer comprising:

a main portable holding body having a grip region for being transported by a user;

detecting means for detecting infrared radiations operatively associated with the main holding body, said detecting means having at least one sensor member of infrared-radiation intensity and at least one waveguide having a first end ready to be turned towards the region of the human body the temperature of which is wished to be known, and a second end turned towards said sensor member, said waveguide having an inner surface defining a passage for bringing into communication first and second openings opposite to each other, the openings being limited by respective borders and said inner surface having at least one portion converging in the direction of the second opening, said convergent portion of the waveguide comprising at least two lengths that are axially consecutive to each other, in which the length which is the closest to the second opening has a greater convergence than the other length;

said process comprising the steps of:

arranging said infrared thermometer so that the first end of said waveguide be turned towards the region of the human body and the radiations pass through the first opening of the inner surface, the first end of said waveguide being positioned at a predetermined distance from the respective region of the body;

avoiding by multiple reflections that radiations marked inclined with respect to the longitudinal axis of the waveguide reach the sensor member;

conveying the radiations parallel or slightly inclined relative to the longitudinal axis of the waveguide towards the sensor member of the detecting means, reading the thermal level of the radiations conveyed to the sensor member.

20. Process according to claim 19 wherein the step of avoiding by multiple reflections is performed by reflecting outside the first opening marked radiations previously entered the same first opening.

21. Process according to claim 19, said step of arranging the first end of the waveguide comprises the step of placing the longitudinal axis of the waveguide substantially orthogonal to the region of the human body the temperature of which is wished to be known.

22. Process according to claim 19, wherein said step of arranging the first end of the waveguide comprises the step of not providing the first opening with a protection mask.

23. Process according to claim 19, further comprising a step of determining a correct positioning of the sensor member to a predetermined distance D from the region of the human body.

24. Process according to claim 23, wherein distance D is selected among correct positioning distances to be optimal for execution of a precise reading.

25. Process according to claim 23, wherein a selection distance D confines the reading area exclusively to the region of interest.

26. Process according to claim 19, wherein the waveguide is an optical filter for incoming radiations that follow marked inclined directions with respect to the longitudinal axis of the waveguide.

27. Use of a portable infrared thermometer for detecting infrared radiations emitted by a region of a human body and establishing the thermal level of such region comprising:

a main holding body having a grip region for being transported by a user; detecting means for detecting infrared radiations operatively associated with the main holding body, said detecting means having at least one sensor member of infrared-radiation intensity and at least one waveguide having a first end ready to be turned towards the body the temperature of which is wished to be known, and a second end turned towards said sensor member, said waveguide having an inner surface defining a passage for bringing into communication first and second openings opposite to each other, the openings being limited by respective borders and said inner surface having at least one portion converging in the direction of the second opening, said convergent portion of the waveguide comprising at least two lengths that are axially consecutive to each other, in which the length which is the closest to the second opening has a greater convergence than the other length.

* * * * *

UNITED STATES PATENT AND TRADEMARK OFFICE
CERTIFICATE OF CORRECTION

PATENT NO.          : 7,048,437 B2
APPLICATION NO. : 11/215924
DATED                  : May 23, 2006
INVENTOR(S)        : Francesco Bellifemine It is certified that error appears in the above-identified patent and that said Letters Patent is hereby corrected as shown below:

On the title page, under Inventor (75) please delete "Bellifernine" and insert therefor --Bellifemine--.

In the drawings, please delete Sheet 2 of 6 in its entirety, and insert therefor the attached Replacement Sheet 2 of 6.

In the drawings, please delete Sheet 3 of 6 in its entirety, and insert therefor the attached Replacement Sheet 3 of 6.

In column 10, lines 41-62 please delete Claim 27.

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,048,437 B2
APPLICATION NO. : 11/215924
DATED : May 23, 2006
INVENTOR(S) : Francesco Bellifemine It is certified that error appears in the above-identified patent and that said Letters Patent is hereby corrected as shown below:

On the title page, under Assignee (73) please delete "Castellini S.p.A., Bologna (IT)" and insert therefor --TECNIMED S.R.L., VARESE (IT)--

Signed and Sealed this

Nineteenth Day of October, 2010

David J. Kappos
*Director of the United States Patent and Trademark Office*